United States Patent
Grage et al.

[15] 3,635,207
[45] Jan. 18, 1972

[54] WIRE-TYPE STONE-CUTTING SAW

[72] Inventors: Casper R. Grage; Theodore R. Vessels, both of Escondido, Calif.

[73] Assignee: Continental Granite Corp., Escondido, Calif.

[22] Filed: Dec. 31, 1969

[21] Appl. No.: 889,581

[52] U.S. Cl. ............................................................. 125/21
[51] Int. Cl. ............................................................ B28d 1/08
[58] Field of Search ................................................. 125/21

[56] References Cited

UNITED STATES PATENTS

| | | | |
|---|---|---|---|
| 3,158,146 | 11/1964 | Allen | 125/21 |
| 2,150,381 | 3/1939 | Lansing | 125/21 |
| 2,795,222 | 6/1957 | Garrison | 125/21 |

*Primary Examiner*—Harold D. Whitehead
*Attorney*—Ira Milton Jones

[57] ABSTRACT

Two separate wire-type stone-cutting saws are arranged side-by-side with the cutting stretches of their wires traveling linearly across the same work zone; the wire-guiding wheels of both saws being carried by frames with trolleys at their upper and lower ends that ride on rigid upright columns at opposite sides of the work zone, the connections between the wheel frames and the trolleys being transversely adjustable so that the location of the cut to be made by each saw can be set without disturbing the block of stone to be cut, and the wheel frames of the two saws also being tiltable into downwardly convergent relationship to bring the bottom peripheral portions of their lower wheels and hence their cutting stretches into close juxtaposition.

3 Claims, 8 Drawing Figures

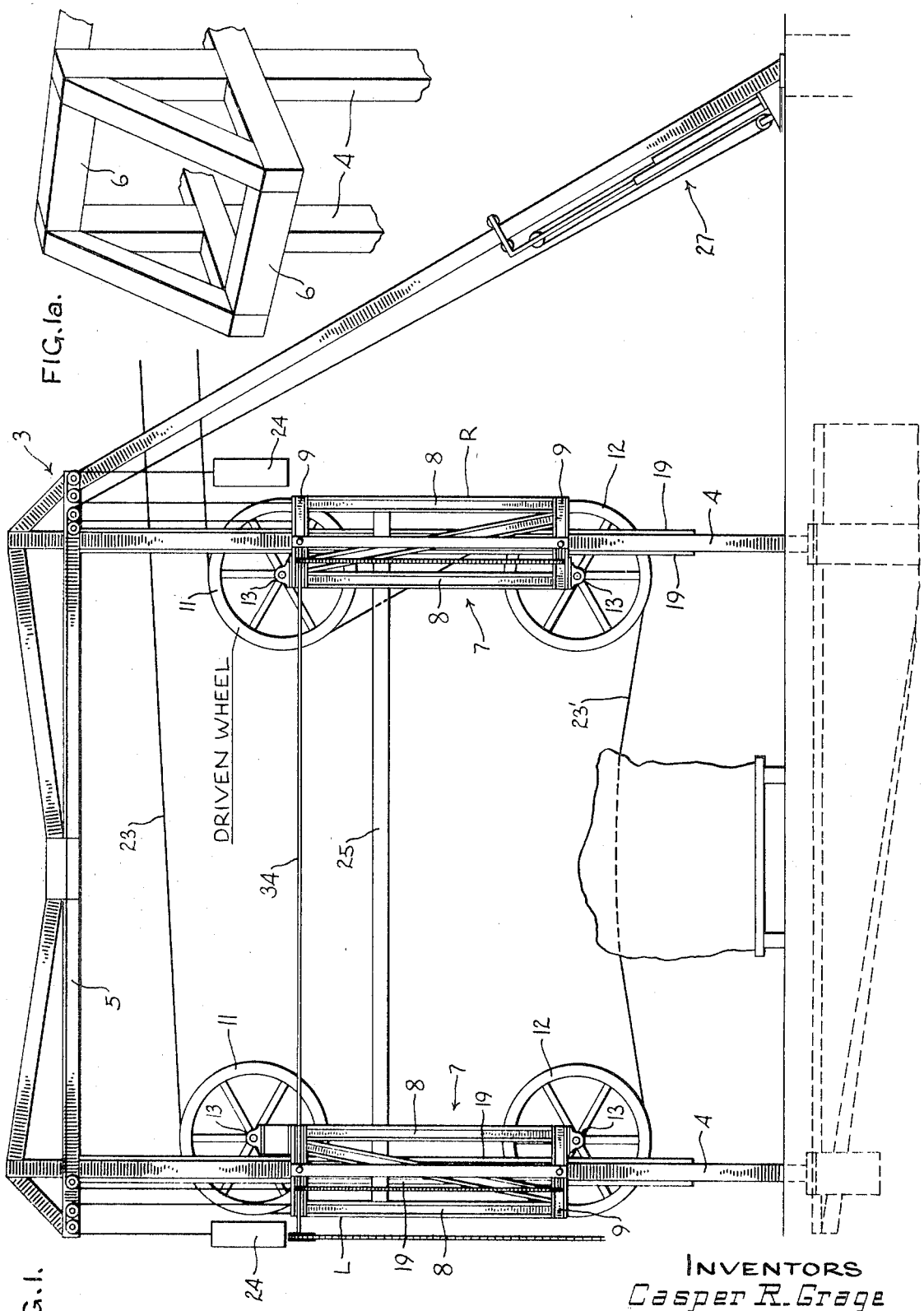

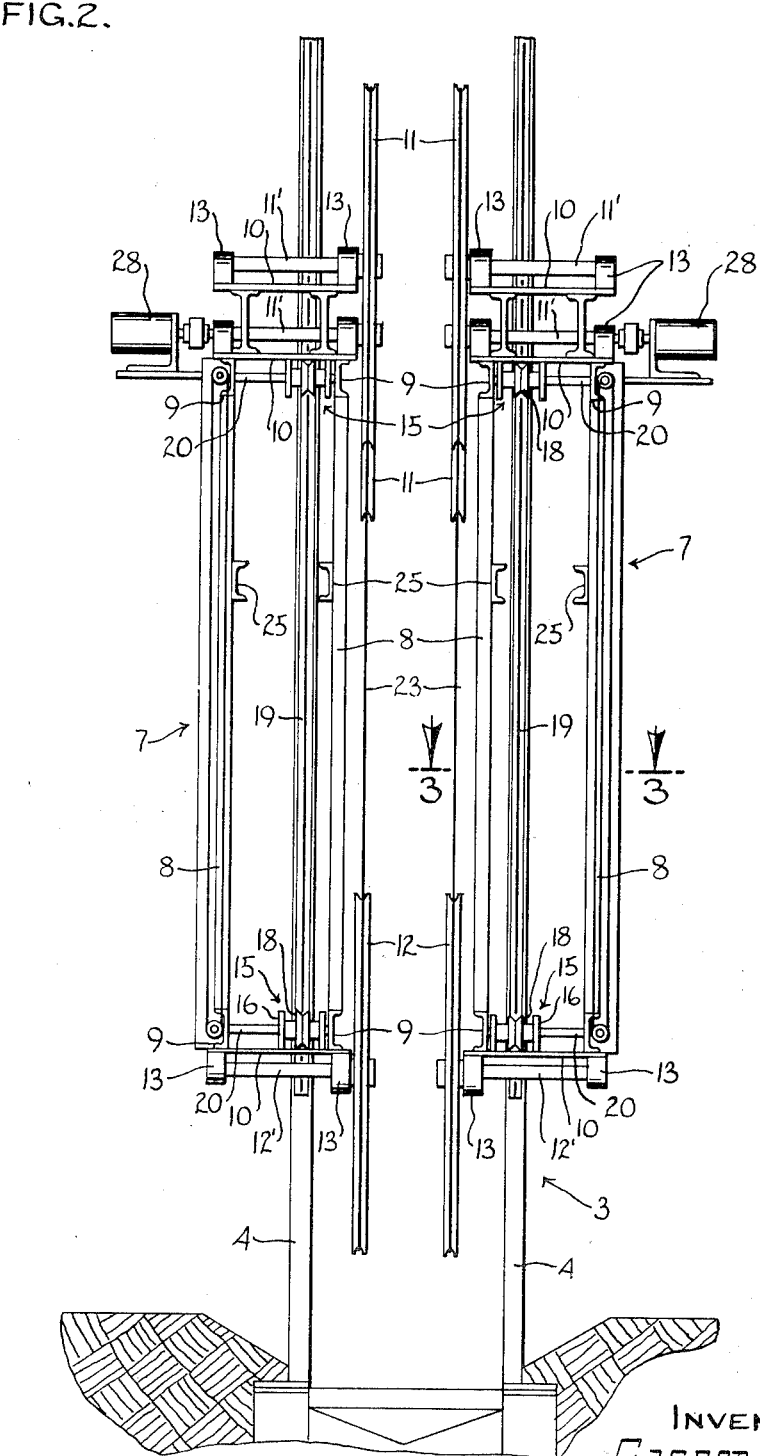

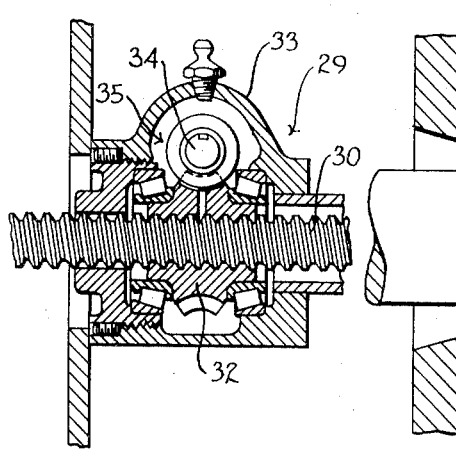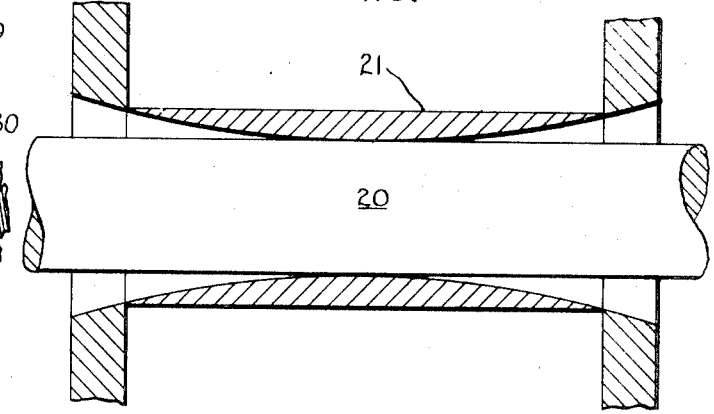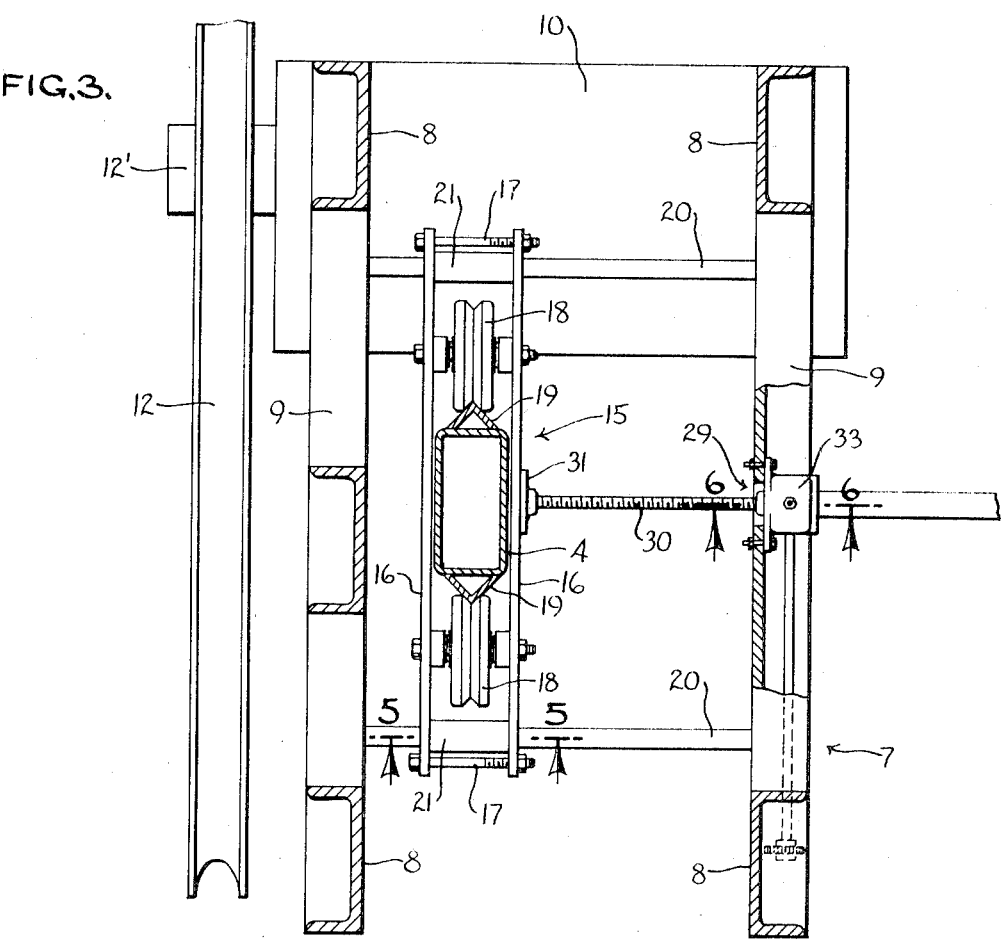

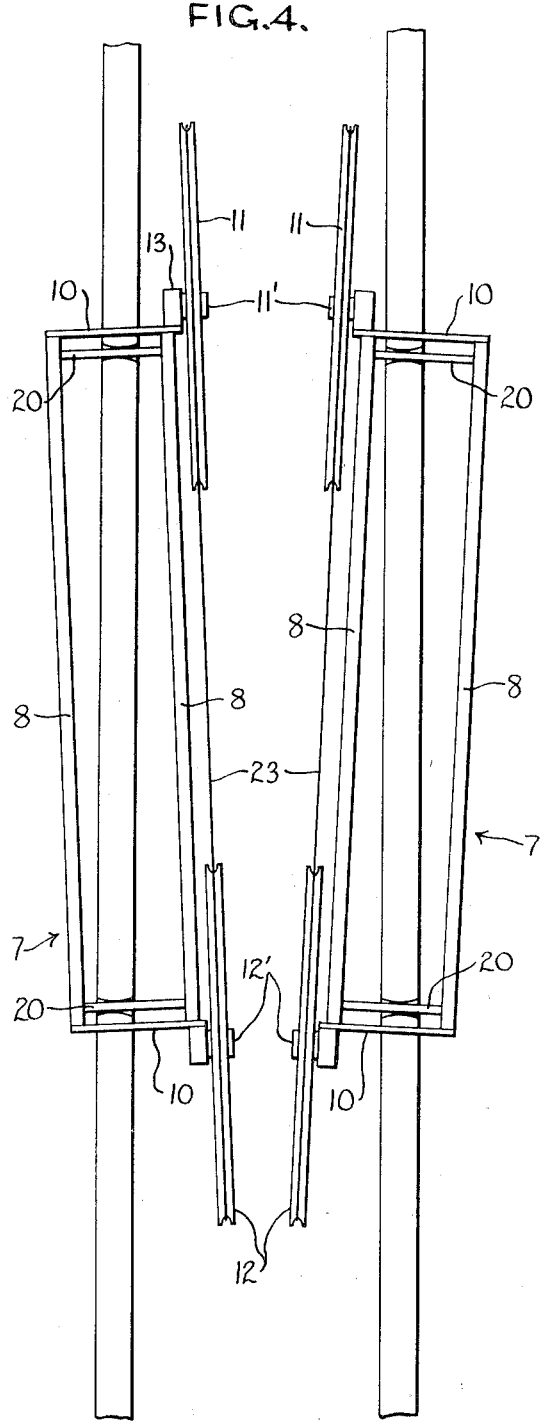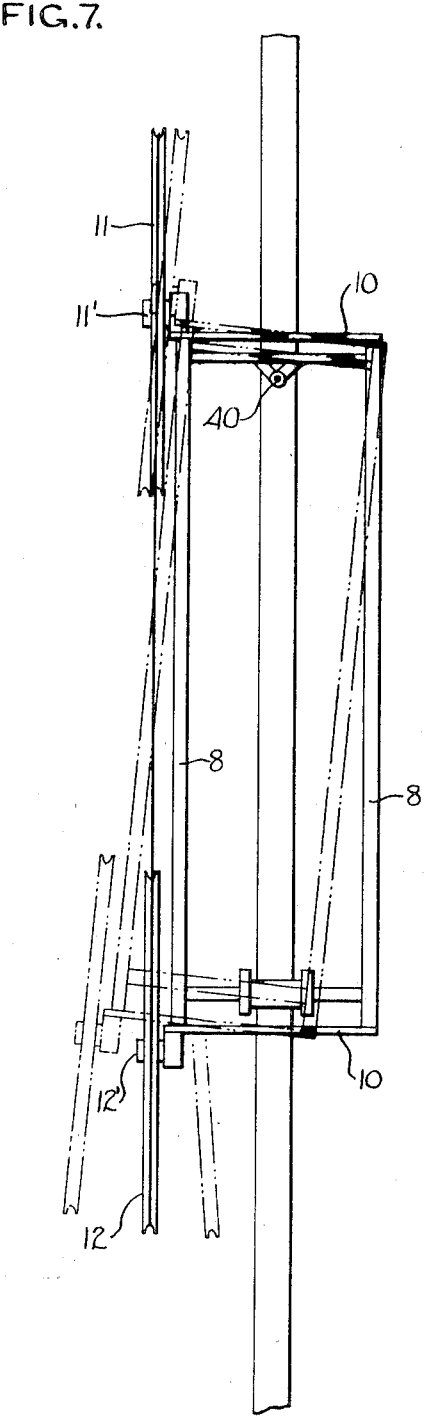

WIRE-TYPE STONE-CUTTING SAW

This invention relates to wire-type stone-cutting saws such as that illustrated in the Grage U.S. Pat. No. 3,434,362.

In such saws, an endless wire of considerable length, is trained over a set or group of wheels that are carried by vertically movable carriages. These carriages ride up and down on rigid upright tracks located at opposite sides of a work zone in which the blocks of stone to be cut are placed. There are at least two upper and two lower wheels in each set or group, and one stretch of the wire trained over the wheels is tangent to the bottom peripheral portions of the lower wheels and travels linearly across the work zone to have cutting engagement with a block of stone placed therein as the wheel carriages descend.

Power applied to one of the wheels pulls the wire across the stone so that by keeping the zone of contact between the wire and the stone flooded with an abrasive slurry, the desired cutting action takes place.

Side-by-side sets or groups or wheels, each handling a separate wire, enables making more than one cut at a time, so that a block of stone can be cut into one or more slabs of a thickness determined by the distance the sets or groups of wheels, and hence the cutting stretches of the wires trained thereover, are spaced apart. Heretofore, it has always been the practice to mount the wheels of the several sets or groups on common shafts. This necessitated loosening the wheels and sliding them along the shafts whenever a change in the thickness of the slab or slabs was called for. Making such adjustment in the position of the wheels on their shafts was in itself a tedious task due to the restricted accessibility of the wheels; but the highly corrosive conditions caused by chemical reaction from the abrasion slurry, often made it next to impossible to loosen the wheels sufficiently to slide them to a new position. Accordingly, the advantage of being able to cut a slab of specified thickness by two simultaneously progressing cuts was seldom realized. The present invention eliminates this difficulty.

In accordance with this invention two independent saws are arranged side-by-side with their cutting stretches traveling linearly across the same work zone. At least one of these saws is provided with an improved way of adjusting the transverse location of its cutting stretch, which does not entail shifting the wire-guiding wheels on their shafts but, instead, is effected by shifting the wheel carriages transversely of the planes of the cuts to be made. This enables the cutting stretches of the two saws to be quickly set to cut a slab of any specified thickness within a relatively wide range.

Another advantage of the improved way of effecting transverse adjustment of the location of the cutting stretch achieved by this invention, is that indexing of successive cuts made by either of the two saws can be done without disturbing the stone being cut.

The improved way of effecting transverse adjustment of the cutting stretch also makes it possible to have the cuts that are made simultaneously by the two side-by-side saws to be much closer together than was ever possible with conventional multiwire stone-cutting saws.

With these observations and objectives in mind, the manner in which the invention achieves its purpose will be appreciated from the following description and the accompanying drawings which exemplify the invention, it being understood that such changes in the specific apparatus disclosed herein may be made as come within the scope of the claims.

The accompanying drawings illustrate two complete examples of the embodiments of the invention constructed according to the best modes so far devised for the practical application of the principles thereof and in which:

FIG. 1 is a front view of the wire-type stone-cutting machine of this invention;

FIG. 1A is a fragmentary perspective view of one end portion of the stationary frame structure;

FIG. 2 is an end view of the machine viewing the same from the left in FIG. 1 but omitting the upper structure of the stationary frame, and illustrating the saws at their lowermost positions;

FIG. 3 is a horizontal cross-sectional view through a portion of FIG. 2 on the plane of the line 3—3;

FIG. 4 is a more or less diagrammatic end view of the machine to illustrate how the two separate saws, which comprise the complete machine, can coact to cut a very thin slab from a block of stone;

FIG. 5 is a fragmentary detail sectional view taken through FIG. 3 on the plane of the line 5—5;

FIG. 6 is a fragmentary detail sectional view taken through FIG. 3 on the plane of the line 6—6; and FIG. 7 is a more or less diagrammatic end view of one of the two saws, illustrating a modified way of providing for transverse adjustment of the cutting stretch.

Referring to the accompanying drawings, the numeral 3 designates the main frame of the machine of this invention. It comprises four upright columns 4 firmly anchored to a suitable foundation and rigidly connected at the top by parallel rails 5 and transverse crossbars 6. The two columns connected by each of the rails 5 constitute a pair and provide the upright supports for one of the two side-by-side saws which together form the complete machine. The space between the paired columns is the work zone of the machine, in which the blocks of stone to be cut are located, one of which is shown in FIG. 1.

Inasmuch as the two saws are structurally identical, the following description will apply to both.

Mounted on each column is a frame 7 fabricated of structural steel and consisting of elongated vertical members 8 connected at their upper and lower ends by side bars 9 and crossbars 10, to form a boxlike structure encircling the column. Each frame 7 has two edgewise aligned relatively large diameter wire-guiding wheels 11 and 12 mounted thereon, the former being at the top of the frame and the latter at the bottom. These wheels are fixed to shafts 11′ and 12′ which are journaled in bearings 13 that are secured to certain of the crossbars 10. The shafts are suitably secured against axial displacement, and hence the wheels retain their edgewise alignment and a fixed positional relationship with respect to the frame.

The frames 7, which can be considered wheel carriages, have trolleys 15 at their top and bottom ends to mount the carriages for up and down motion upon their respective columns. The trolleys consist of a pair of arms 16 which may be simply flat steel bars, connected together by tie bolts 17 to form rectangular frames which embrace the columns. Trolley wheels 18 freely rotatably mounted between the arms 16 ride upon tracks 19 that are fixed to opposite sides of the column. The trolleys are thus constrained to vertical movement up and down along the columns on which they are mounted.

The trolleys are located within the frame structures comprising the wheel carriages and are connected thereto in a manner accommodating transverse bodily shifting of the wheel carriages with respect to the trolleys, and hence with respect to the columns. In the embodiment of the invention illustrated in all figures with the exception of FIG. 6, the connection between each wheel carriage and its trolleys is the same at both the top and bottom. This connection comprises cross-shafts 20 fixed to and spanning the distance between the side bars 9 of the frame that forms the wheel carriage, and bearings 21 that are fixed to and constitute part of the trolley structures, and in which the cross-shafts are slidably received.

As best seen in FIG. 5, the bearings 21 have convexly curved bores to accommodate relative rocking between the bearings and the shafts therein. The connections between the wheel carriages and their trolleys thus not only accommodate translatory transverse back and forth adjustment of the wheel carriages with respect to their trolleys—and hence the columns on which they ride—but, as shown in FIG. 4, also permit transverse tilting of the carriages. This tiltability of the wheel carriages permits the bottom peripheral portions of the lower wheels of the two adjacent saws to be brought into closer proximity than would otherwise be possible.

As in all wire-type stone-cutting machines, an endless wire 23 of considerable length is trained over the wire-guiding wheels 11 and 12 and such wheels (not shown) located at some distance from the saw—perhaps as much as a quarter mile. The long length of the wire increases its useful life. As shown in FIG. 1, the wire approaching the saw from the remotely located wheel, first passes over the upper wheel of the left-hand carriage L, then downwardly around the lower wheel of that carriage, across the work zone to the lower wheel of the right-hand carriage R from which it extends around the upper wheel of that carriage, back to the remotely located wheel. The stretch 23' of the wire which spans the two lower wheels and is tangent to the bottom peripheral portion of these wheels constitutes the cutting stretch of the wire and hence is brought into contact with the block of stone to be cut upon simultaneous descent of the two wheel carriages.

As is customary, the weight of the wheel carriages is substantially counterbalanced to minimize the power required to elevate them and control their descent. This counterbalancing can be obtained in any conventional manner, as by weights 24 connected with the wheel carriages by cables trained over pulleys at the top of the stationary frame structure of the machine.

Obviously, of course, the wheel carriages must travel up and down in unison. To this end they are rigidly structurally connected by rails 25, and connected to a common hydraulically powered takeup device 27 by means of lifting cables trained over pulleys at the top of the stationary frame structure.

Since the takeup device by which the carriages are simultaneously lifted and their descent is controlled forms no part of this invention, it is merely indicated in FIG. 1.

In order to impart the desired linear travel to the wire, one of the wheels over which it is trained must be power driven, and preferably the powered wheel is the upper one of the right-hand wheel carriage in FIG. 1, where it is designated "Driven Wheel." Any suitable drive motor may be employed to drive this wheel but preferably a hydraulic motor 28 is coupled to its shaft, the motor being mounted on the same crossbar 10 to which the bearings for the driven wheel are secured.

As noted hereinbefore, the wheel carriages are bodily shiftable transversely with respect to their trolleys and the columns upon which they ride. This enables the aligned upper and lower wheels to be adjusted transversely of the plane containing the paired upright columns of each saw. As a result, the distance between the cutting stretches of the two side-by-side saws is adjustable through a relatively wide range, and since it is the distance between these cutting stretches which determines the thickness of a slab cut from a block of stone, this transverse adjustability is a very significant advantage of this invention, especially in view of the ease with which the adjustment can be effected.

Adjustment of the wheel carriages is accomplished by jackscrews 29 connecting the trolleys with the wheel carriages. One such jackscrew is located at the top and another at the bottom of each wheel carriage, and as best seen in FIGS. 3 and 6, each jackscrew comprises a screw 30 fixed to the trolley, as at 31, and a nut 32 rotatably but otherwise immovably mounted in a housing 33 that is fixed to the wheel carriage. For sake of clarity, the jackscrews are not illustrated in FIG. 2.

The nuts of all of the jackscrews are rotated simultaneously to effect translatory transverse adjustment of the wheel carriages by manually turning a drive shaft 34 which extends from one to the other of the wheel carriages at the top thereof. This shaft drives worm and wormwheel gear transmissions 35 by which rotation of the shaft is imparted to the nuts 32 of the jackscrews.

The jackscrews which connect the lower ends of the wheel carriages with the adjacent trolleys have their nuts drivingly connected with the drive shaft 34 by chain and sprocket connections leading to stub shafts upon which the nuts are fixed.

The jackscrews are suitably protected against dirt and the corrosive ambient conditions by enclosing housings and tubular bellows, and the cross-shafts 20 are likewise protected.

As shown in FIG. 4, and as hereinbefore observed, the manner in which the wheel carriages are connected with their trolleys not only permits translatory transverse adjustment of the wheel carriages, but also tilting thereof to bring the bottom peripheral portions of the lower wheels of the two saws into much closer proximity than was heretofore possible, so that relatively thin slabs can be cut.

To effect such tilting adjustment of the wheel carriages, it is of course necessary that the upper and lower jackscrews be actuated in opposite directions. This can be accomplished by providing a suitable reverse gear driving connection between the top and bottom jackscrews or in any other suitable manner.

The transverse adjustability of the wheel carriages and, more particularly, the cutting stretches spanning the lower wheels thereof, not only facilitates cutting slabs of different thicknesses, but also has the advantage of permitting indexing of successive cuts without disturbing the block of stone being cut. The significance of this advantage will be apparent when it is realized that often the block of stone being cut weighs several tons.

Since the ultimate objective of having the wheel carriages transversely adjustable is to enable the cutting stretch thereof to be moved transversely toward or from the plane containing the upright columns of a saw, the modified embodiment of the invention illustrated in FIG. 6 can be used to great advantage. In this case, the wheel carriages are pivotally connected at the top to their adjacent trolleys, as at 40, but at the bottom there are jackscrews to shift the carriages to the right or the left.

Those skilled in the art will appreciate that the invention can be embodied in forms other than as herein disclosed for purposes of illustration.

The invention is defined by the following claims:

1. A wire-type stone-cutting saw comprising:
    A. a pair of rigid parallel upright columns spaced apart to define a work zone therebetween;
    B. a wheel carriage embracing each column;
    C. upper and lower wire-guiding wheels rotatably carried by each wheel carriage with their axes parallel and transverse to a vertical plane containing the columns and with the wheels constrained against axial displacement with respect to the carriage;
    D. a wire trained over the wheels with one stretch thereof tangent to the bottom of the lowermost wheels to travel linearly across the work zone for cutting engagement with a block of stone in position to be cut, upon the application of driving torque to one of the wheels and simultaneous descent of both wheel carriages;
    E. upper and lower vertically spaced trolleys for each wheel carriage riding on the upright columns and constrained to vertical translation;
    F. means forming an adjustable connection between each wheel carriage and its respective upper and lower trolleys,
        said adjustable connections providing for translatory horizontal shifting of the wheel carriages with respect to said vertical plane containing the columns and also tilting of the wheel carriages about a horizontal axis lying on said plane and above the axes of the lower wheels to, in each instance, enable the bottom of the lower wheels and the cutting stretch of the wire spanning the same to be moved closer to or farther from said vertical plane;
    G. adjusting means reacting between each wheel carriage and its trolleys for adjusting the relative positions thereof both translatorily and tiltably as provided for by said adjustable connections; and
    H. manually operable actuating means connected to said adjusting means of both wheel carriages.

2. The combination of two of the wire-type stone-cutting saws defined in claim 1, arranged side-by-side with the cutting stretches of their wires traveling linearly across the same work zone between and parallel to the planes containing the upright columns of the two saws,
    so that two parallel cuts can be made simultaneously in a block of stone to cut a slab from the block, the thickness of which is determined by the adjusted distance between the cutting stretch of either or both of the saws and the upright columns thereof.

3. The saw of claim 1 further characterized in that said adjustable connections between the wheel carriages and their upper and lower trolleys comprise a bearing on each trolley and shafts on the wheel carriages slidably and rockably received in said bearings.

* * * * *